(12) United States Patent
Odell et al.

(10) Patent No.: US 11,153,220 B2
(45) Date of Patent: Oct. 19, 2021

(54) METHODS AND APPARATUS TO DETERMINE NETWORK DELAY WITH LOCATION INDEPENDENCE

(71) Applicant: AirMagnet, Inc., Santa Clara, CA (US)

(72) Inventors: Craig Odell, Colorado Springs, CO (US); Daniel Prescott, Elbert, CO (US); Douglas M. Roberts, McDonough, GA (US); Daniel Draper, Seattle, WA (US); Jason Liptak, Colorado Springs, CO (US)

(73) Assignee: AirMagnet, Inc., Santa Clara, CA (US)

( * ) Notice: Subject to any disclaimer, the term of this patent is extended or adjusted under 35 U.S.C. 154(b) by 368 days.

(21) Appl. No.: 15/913,470

(22) Filed: Mar. 6, 2018

(65) Prior Publication Data

US 2018/0198721 A1   Jul. 12, 2018

Related U.S. Application Data

(62) Division of application No. 14/218,718, filed on Mar. 18, 2014, now abandoned.

(51) Int. Cl.
| H04L 12/807 | (2013.01) |
| H04L 12/26 | (2006.01) |
| H04L 12/825 | (2013.01) |
| H04L 12/24 | (2006.01) |
| H04L 29/06 | (2006.01) |

(52) U.S. Cl.
CPC .............. *H04L 47/27* (2013.01); *H04L 43/50* (2013.01); *H04L 47/266* (2013.01); *H04L 41/5067* (2013.01); *H04L 43/0852* (2013.01); *H04L 69/163* (2013.01)

(58) Field of Classification Search
CPC ..... H04L 69/16; H04L 47/193; H04L 47/283; H04L 69/166; H04L 47/25; H04L 47/263; H04L 43/0852; H04L 1/0002; H04L 43/10; H04L 43/50
See application file for complete search history.

(56) References Cited

U.S. PATENT DOCUMENTS

| 7,472,156 B2 * | 12/2008 | Philbrick ................ H04L 29/06 |
| | | 709/201 |
| 8,879,558 B1 | 11/2014 | Rijsman |
| 2002/0120727 A1 | 8/2002 | Curley et al. |
| 2003/0115338 A1 | 6/2003 | Jayam et al. |

(Continued)

FOREIGN PATENT DOCUMENTS

| EP | 2222025 A1 | 8/2010 |
| EP | 2523407 A1 | 11/2012 |

OTHER PUBLICATIONS

Office Action from the European Patent Office for European Patent Application No. EP15159699.6, dated Feb. 13, 2019.

(Continued)

*Primary Examiner* — Oussama Roudani
(74) *Attorney, Agent, or Firm* — Locke Lord LLP; Scott D. Wofsy; Christopher J. Capelli

(57) ABSTRACT

The techniques disclosed herein determine a location independent network delay via a network monitoring device. Such techniques particularly include determining various delays such as a zero window delay, an advertised window delay, and a congestion window delay (including slow start delays).

7 Claims, 10 Drawing Sheets

(56) References Cited

U.S. PATENT DOCUMENTS

| | | | |
|---|---|---|---|
| 2004/0236802 A1 | 11/2004 | Baratakke et al. | |
| 2007/0028142 A1 | 2/2007 | Elsner et al. | |
| 2011/0222447 A1* | 9/2011 | Wang | H04L 1/188 370/310 |
| 2012/0290709 A1 | 11/2012 | Roberts et al. | |
| 2013/0176854 A1* | 7/2013 | Chisu | H04W 80/06 370/241 |
| 2014/0050095 A1* | 2/2014 | Szilagyi | H04L 1/0002 370/236 |
| 2015/0089500 A1* | 3/2015 | Kompella | H04L 43/18 718/1 |
| 2015/0236966 A1* | 8/2015 | Francini | H04L 43/0864 370/235 |

OTHER PUBLICATIONS

Defense Advanced Research Projects Agency Information Sciences Institute University of Southern California "Transmission Control Protocol DARPA Internet Program Protocol Specification prepared for Information Processing Techniques Office 1400 Wilson Boulevard 22209 by ; rfc793.txt", Transmission Control Protocol DARPA Internet Program Protocol Specification Prepared for Information Processing Techniques Office by; rfc793.txt, Internet Engineering Task Force, IETF; Standard, Internet Society (ISOC) 4,, Sep. 1, 1981 (Sep. 1, 1981), XP015006775.

Extended European Search Report for European Patent Application No. 15159699.6, dated Nov. 24, 2015.

Haijin Yan, et al., "Improving Passive Estimation of TCP Round-Trip Times Using TCP Timestamps"; Department of Computer Science, University of Georgia, 0-7803-8836-4/04© 2004 IEEE, pp. 181-185.

Examiner's Report for European Patent Application No. 15159699.6, dated Aug. 21, 2017.

Examiner's Report for European Patent Application No. 15159699.6, dated Apr. 26, 2018.

Chris Greer, The TCP Window, Jul. 26, 2010.

Extended European Search Report for European Patent application No. EP19206368.3, dated Feb. 20, 2020.

Siekkinen M., et al.: "A root cause analysis toolkit for TCP", Computer Networks, Elsevier, Amsterdam, NL, vol. 52, No. 9, Jun. 26, 2008 (Jun. 26, 2008), pp. 1846-1858, XP022670171, ISSN: 1389-1286, DOI: 10.1016/J.COMNET.2008.03.005 [retrieved on Mar. 21, 2008].

Timmer, M., et al.: "How to Identify the Speed Limiting Factor of a TCP Flow", End-To-End Monitoring Techniques and Services, 2006 4th IEEE/IFIP Work Shop on Vancouver, Canada 03-03 Apr. 2006, Piscataway, NJ, USA, IEEE, Apr. 3, 2006 (Apr. 3, 2006), pp. 17-24, XP010926698, DOI: 10.1109/E2EMON.2006.1651275; ISBN: 978-1-4244-0145-1.

\* cited by examiner

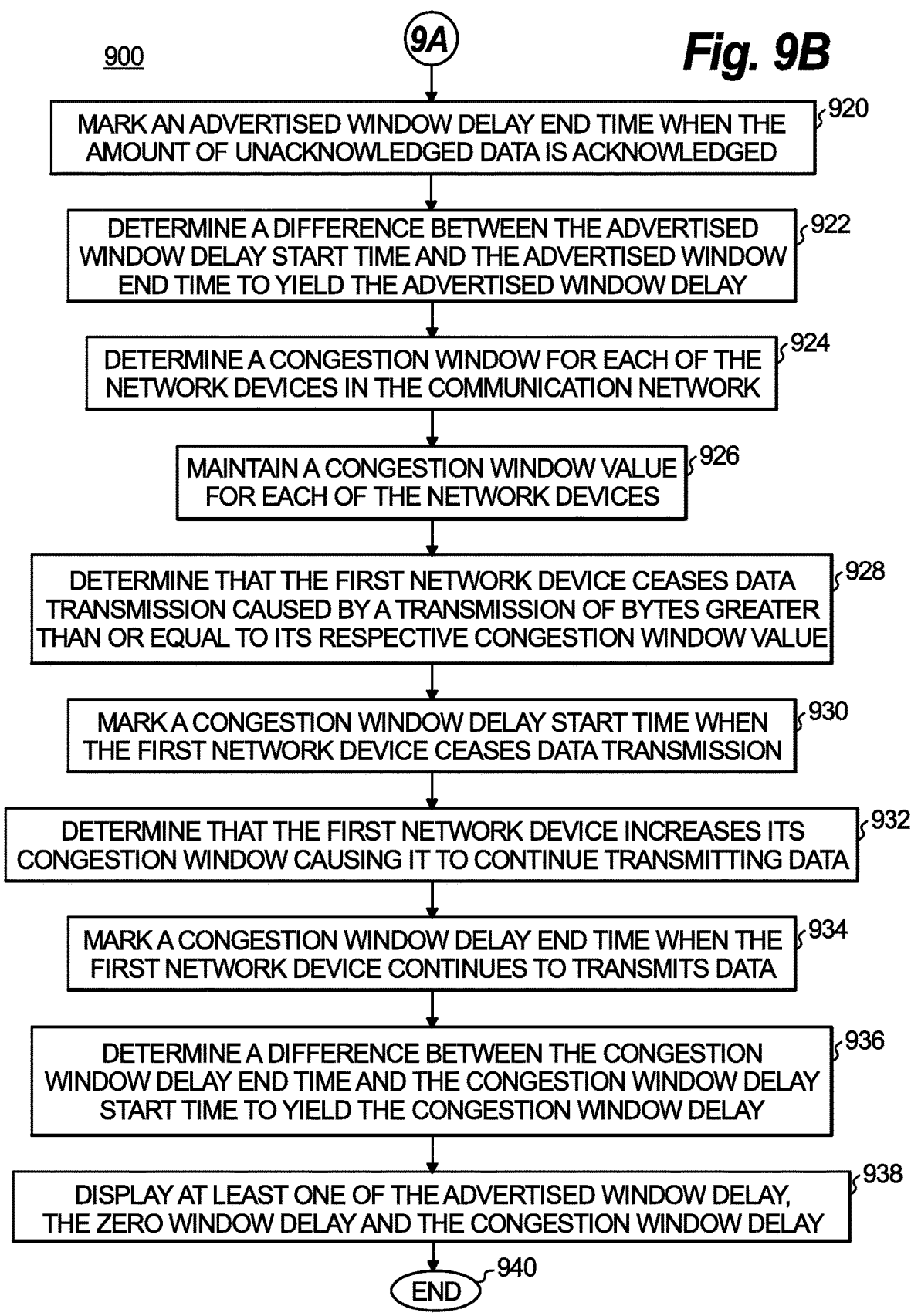

METHODS AND APPARATUS TO DETERMINE NETWORK DELAY WITH LOCATION INDEPENDENCE

BACKGROUND

1. Field of the Invention

The present disclosure relates to communication networks, and more particularly, to determining various types of network delay with location independence.

2. Description of the Related Art

Communication networks typically include, in part, various client-side and server-side devices that transfer information or data there-between. Importantly, metrics such as response time and communication delay between the various network devices provides insight into traffic flow and can be used for developing delay mitigation strategies as well as used to implement changes to network topology, improve communication protocols, and the like.

Network delay between the various devices can be measured, for example, as an end user response time, and includes an aggregate of an application response time, a data transfer time, and a network round trip. Application response time reflects a time to a first byte for transaction response, the data transfer time represents a total time to send all of the requested data in response to a single transaction request, and a network round trip represents a bi-directional network latency (e.g., excluding client/server processing time). Although various techniques are used to measure this end-user response time, however, such techniques are typically influenced by the location where measurement occurs. That is, these various techniques yield different results if measured from close to a server-side device, close to a client-side device, or somewhere in between.

Although determining the end-user response time in this fashion may be important in certain applications, such end-user response time does not scale appropriately when implemented in virtualization solutions and/or cloud outsourcing solutions (e.g., moving further from a server). Accordingly, there is still a need for improved network delay techniques that allow for location independence that are scalable and suitable for virtualized as well as cloud solutions.

SUMMARY

The techniques disclosed herein determine a location independent network delay, via a network monitoring device. Such techniques particularly include determining various delays such as a zero window delay, an advertised window delay, and a congestion window delay (including slow start delays).

In one exemplary embodiment of the invention, the network device monitors an exchange of data between at least a first network device and a second network device and determines the first network device received data in excess of its capacity (e.g., by receiving a window update from the first network device) thereby causing its transmission control protocol (TCP) window to reduce to zero. The network monitoring device further marks a zero window delay start time once the first network device receives data in excess of its capacity. Subsequently, the network monitoring device determines that the TCP window size for the first network device increases from zero (e.g., via a window update from the first network device) and marks a zero window delay end time once the TCP window size of the first network device increases from zero, and determines a difference between the zero window delay end time and the zero window delay start time to yield a total zero window delay. In certain embodiments, the network monitoring device displays, via a display, the total zero window delay.

In certain other embodiments, the network monitoring device monitors an exchange of data between at least a first network device and a second network device and determines that the first network device ceased transmission of data caused by an amount of non-acknowledged data by the second network device (e.g., when the amount of non-acknowledged data by the second device exceeds a previously advertised window from the first device). The network monitoring device marks an advertised window delay start time when the first network device ceases transmission of data. Subsequently, the network monitoring device determines that the first network device continues transmission of data once the non-acknowledged data is acknowledged by the second network device and marks an advertised window delay end time when the first network device continues transmission of data. The total advertised window delay is then determined as a difference between the advertised window delay start time and the advertised window delay end time. In certain embodiments, the network monitoring device displays, via a display, the total advertised window delay.

In further embodiments, the network monitoring device determines a congestion window delay. To determine the congestion window delay, the network monitoring device monitors an exchange of data between a first network device and a second network device, and determines a congestion window for at least the first network device, and maintains a congestion window value for at least the first network device. The network monitoring device further determines that the first network device ceased data transmission caused by a transmission of bytes greater than or equal to its congestion window value and marks a congestion window start time when the first network device ceases data transmission. Subsequently, the network monitoring device also determines that the first network device increases its congestion window causing it to continue transmitting data and marks a congestion window end time when the first network device continues to transmit data. A total congestion window delay is determined by a difference between the congestion window end time and the congestion window start time.

It should be noted that such techniques are employed client-side, server-side and network points there-between.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIGS. 9A-9B illustrate an example simplified procedure for determining network delay independent of location.

A component or a feature that is common to more than one drawing is indicated with the same reference number in each of the drawings.

DESCRIPTION OF EXAMPLE EMBODIMENTS

The invention of this disclosure provides techniques for determining network delay with location independence. That is, using the techniques disclosed herein, network delay can be consistently determined from various locations in a network (e.g., client-side, server-side, in-between, etc.). Such techniques prove scalable and particularly useful for cloud based and virtualization based network solutions. Further, based on the determined network delay, mitigation actions can be performed to reduce or eliminate the delay. Reference will now be made to the drawings.

Figure 1:
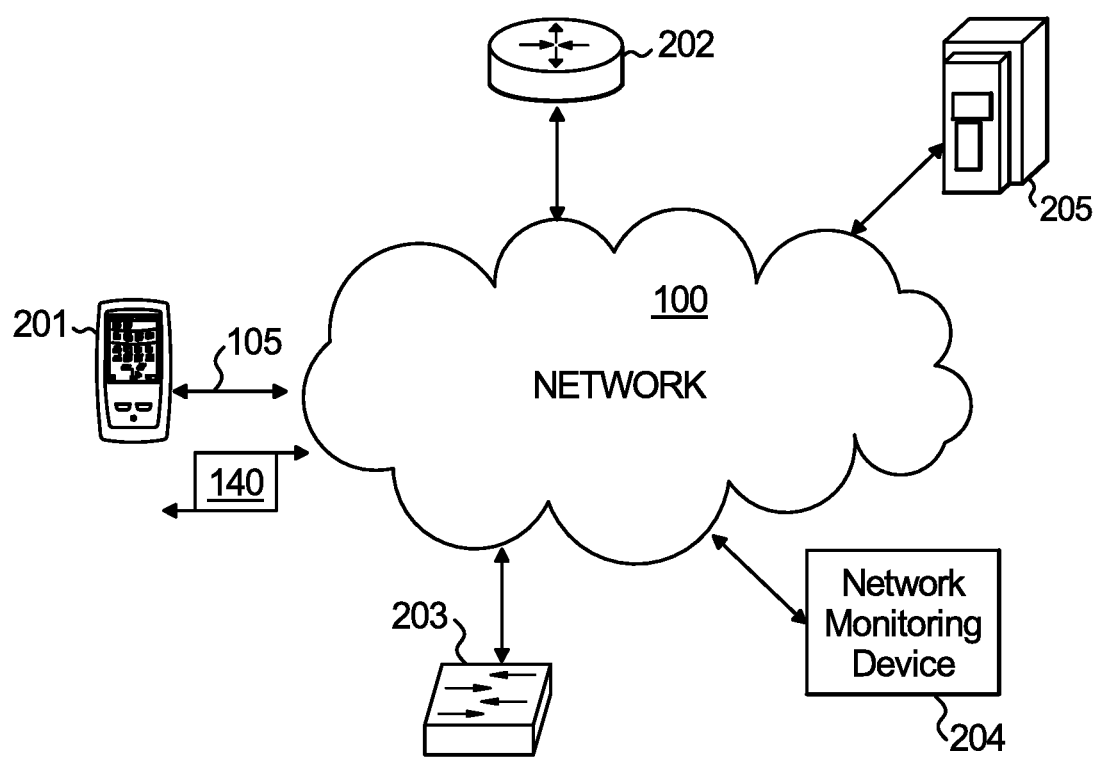
FIG. 1 illustrates an example communication network.

Referring to FIG. 1, a schematic block diagram of a communication network 100 is shown. Communication network 100 is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, Watt Pulse Communication (WPC), and others.

Still referring to FIG. 1, communication network 100 illustratively comprising nodes/devices 200 (e.g., labeled as shown, 201-205) interconnected by various methods of communication. For instance, a link 105 may be wired links or may comprise a wireless communication medium, where certain nodes 201, such as, e.g., a client node, etc., may be in communication with other nodes 202-205, e.g., routers, sensors, computers, etc., based on distance, signal strength, current operational status, location, etc. Those skilled in the art will understand that any number of nodes, devices, links, etc. may be used in the computer network, and that the view shown herein is for simplicity.

Figure 2:
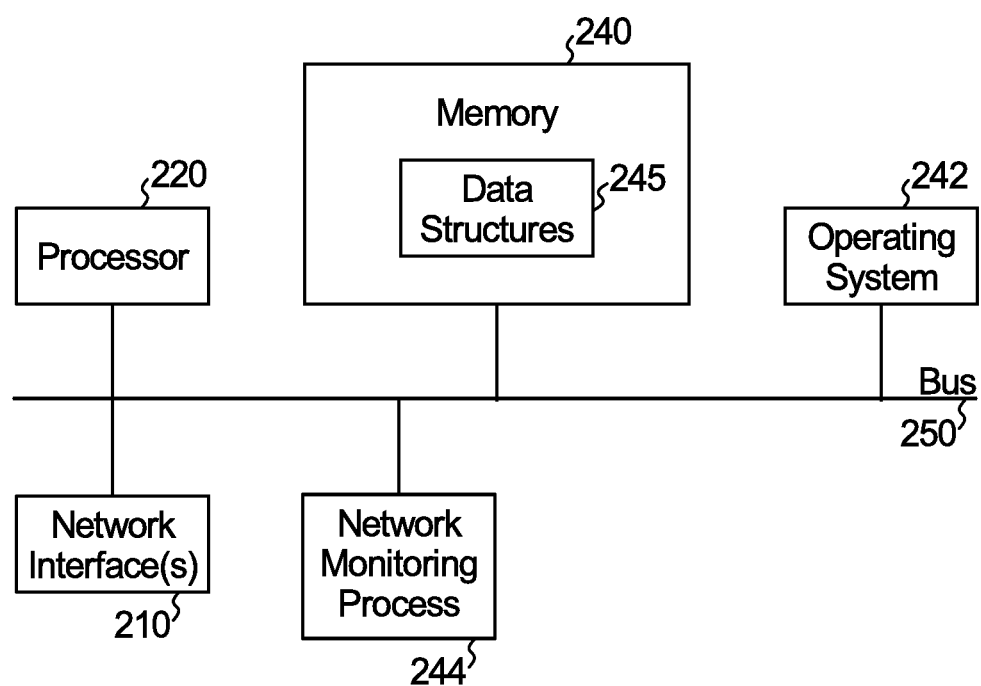
FIG. 2 illustrates an example network device/node.

FIG. 2 is a schematic block diagram of an example node/device 200 that may be used with one or more embodiments described herein, e.g., as a network monitoring device 204, in the network 100. The device 200 may comprise one or more network interfaces 210, at least one processor 220, and a memory 240 interconnected by a system bus 250.

The network interface(s) 210 contain the mechanical, electrical, and signaling circuitry for communicating data over physical and/or wireless links coupled to the network 100. The network interfaces may be configured to transmit and/or receive data using a variety of different communication protocols, including, inter alia, TCP/IP, UDP, wireless protocols (e.g., IEEE Std. 802.15.4, WiFi, Bluetooth®,), Ethernet, power-line communication (PLC) protocols, etc.

The memory 240 comprises a plurality of storage locations that are addressable by the processor 220 and the network interfaces 210 for storing software programs and data structures associated with the embodiments described herein. As noted above, certain devices may have limited memory or no memory (e.g., no memory for storage other than for programs/processes operating on the device). The processor 220 may comprise necessary elements or logic adapted to execute the software programs and manipulate data structures 245, such as routes or prefixes (notably on capable devices only). An operating system 242, portions of which are typically resident in memory 240 and executed by the processor, functionally organizes the device by, inter alia, invoking operations in support of software processes and/or services executing on the device. These software processes and/or services may comprise network monitoring process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Network monitoring process (services) 244 contains computer executable instructions executed by the processor 220 to perform functions, such as monitoring data packets transmitted between the various nodes in communication network 100, as will be understood by those skilled in the art.

Illustratively, the techniques described herein may be performed by hardware, software, and/or firmware, such as in accordance with the network monitoring process 244, which may contain computer executable instructions executed by the processor 220 (or independent processor of interfaces 210) to perform functions relating to the techniques described herein.

As noted above, the techniques disclosed herein determine network delay consistently from various locations in a network (e.g., client-side, server-side, in-between, etc.). Such techniques prove scalable and particularly useful for cloud based and virtualization based network solutions.

Figure 3:
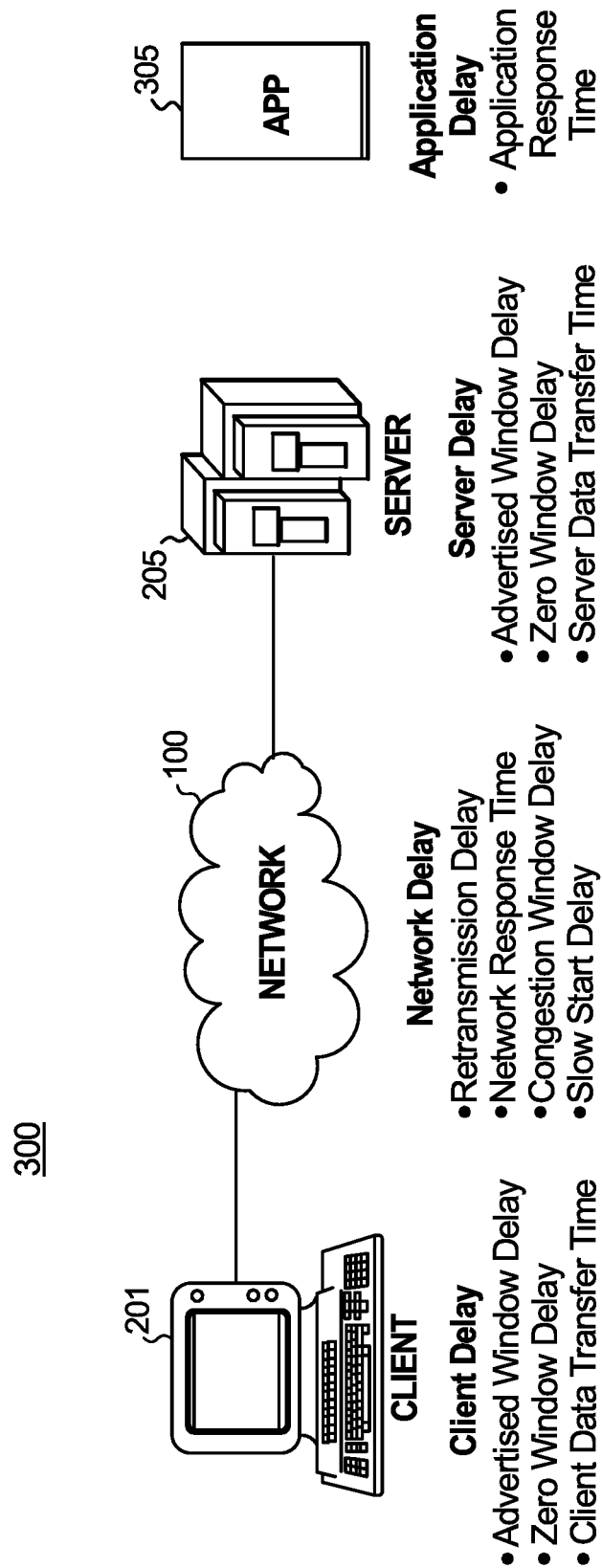
FIG. 3 illustrates a schematic diagram 300 showing various types of delay associated with respective network components.

For example, FIG. 3 illustrates a schematic diagram 300, showing various types of delay associated with respective network components. As shown, client node 201 includes client delays, such as advertised window delays, zero window delays, and client data transfer time. Network 100 delays include, for example, retransmission time, network response time, congestion window delay and slow start delays. Server 205 includes server delays such as advertised window delay, zero window delay, and server data transfer time. Application 305 includes application delays, such as application response time.

Figure 4:
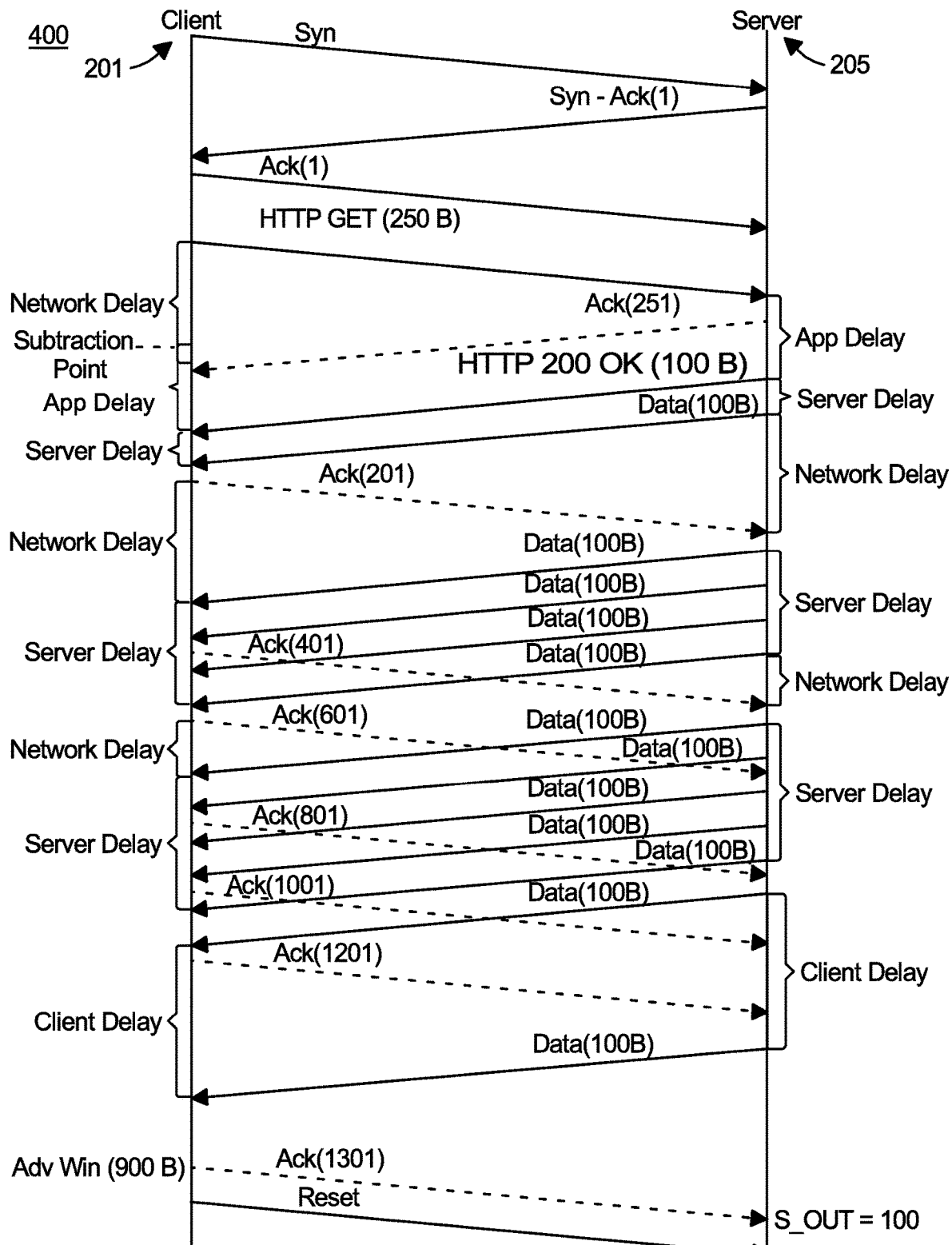
FIG. 4 is a signaling diagram, showing various types of client and server delays.

FIG. 4 is a signaling diagram 400 showing each of the above-described delays attributable to client 201 or server 205. Notably, determining each of these delays yields a location independent end-user response time since the same total response time and associated breakdown times are equivalent for each sides (including a middle point) of the signaling diagram. Each of the delays is discussed in greater detail below.

For purposes of the discussion below, it should be noted that terms such as sender/receiver and endpoint are used and may refer to a client device or a server device, or both, as will be understood by those skilled in the art. Further, unless otherwise specified, each of these delays can be attributable to any client device, server device, or both.

Zero Window Delay

Figure 5:
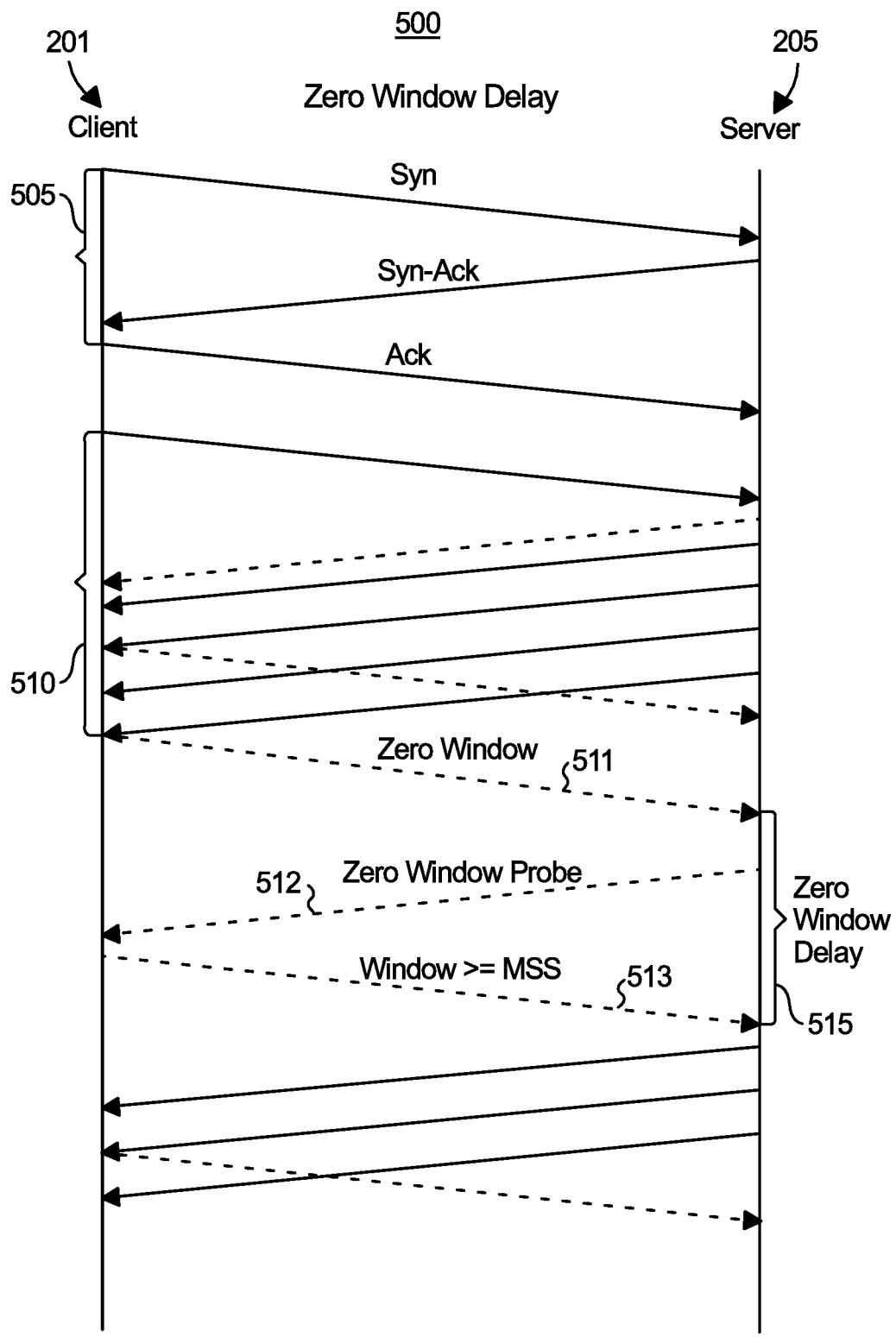
FIG. 5 is a signaling diagram, showing techniques for determining a zero window delay.

FIG. 5 is a signaling diagram 500, showing techniques for determining the zero window delay. Zero Window Delay (ZWD) refers to an amount of delay time due to a receiver device (e.g., one of nodes 201-205) sending a zero window. Notably, dashed lines represent explicit acknowledgements (e.g., acknowledgements without data). Additionally, zero window delay can either be client-ZWD or server-ZWD depending on which device sends a zero window. Put differently, if the server is sending data and the client sends a zero window, then this would be client-ZWD (and vice versa). For purposes of simplicity, discussion is generalized to a client-side zero window.

First, during initial signaling 505, TCP Window sizes are exchanged during the TCP connection phase (e.g., a three way handshake at the start). This initial TCP window represents a number of bytes and endpoint (e.g., here—client 201) can receive before the sender (e.g., here—server 205) stops sending data and waits for an acknowledgment (which also contains a window update). A network monitoring device (e.g., device 204) watches or monitors this data flow and tracks TCP windows for each endpoint. Also during this TCP connection phase, a Maximum Segment Size (MSS) is exchanged and also monitored by the network monitoring device 204.

As data and acknowledgements flow between client 201 and server 205, during signaling 510, the TCP window size is updated as part of the TCP Header information passed in every TCP segment. The meaning of the window remains the same and represents the number of bytes that the each endpoint can receive. Window updates occur with every TCP segment because the TCP window is not only influenced by this flow, but all other flows between other endpoints. For example, while the data is exchanged during signaling 510 between the devices shown in diagram 500, the client 201 (or server 205) can also be communicating with other endpoints (e.g., another node 202, 203, 204, etc.), which will impact impacts respective window sizes.

If at some point the amount of data that an endpoint receives exceeds its capacity for reception, then the TCP window is reduced to zero. This means that the sender halts or ceases transmission of data to that endpoint/receiver until the endpoint/receiver processes data in its buffers and clears bandwidth to receive more data. A window update 511 sent from the receiver/endpoint to the sender that contains a window update stating that the TCP window is zero if referred to as a "zero window". Network monitoring device 204 monitors this flow, identifies a zero window and marks that point in time as the start of a zero window delay.

Notably, while the TCP window of the client 201 remains zero, the sender (e.g., server 205) requests window updates via Zero Window Probes(s) 512 (a data packet with 1 byte) to get updated window information.

When the endpoint/receiver processes the data in its buffers, its TCP window size will increase. Once the TCP window size of the endpoint/receiver increases to the point where it is greater than or equal to the maximum segment size, the flow of data continues. A window update 513 indicating a TCP window size greater than or equal to MSS marks the end of the zero window delay period. Network monitoring device 204 marks the end of the zero window delay when it determines such a window update is sent. Accordingly, the network monitoring device 204 determines a total zero window delay 515 as a difference in the time between seeing 3 and 5 (the zero window update to the window>=MSS update).

Advertised Window Delay

Figure 6:
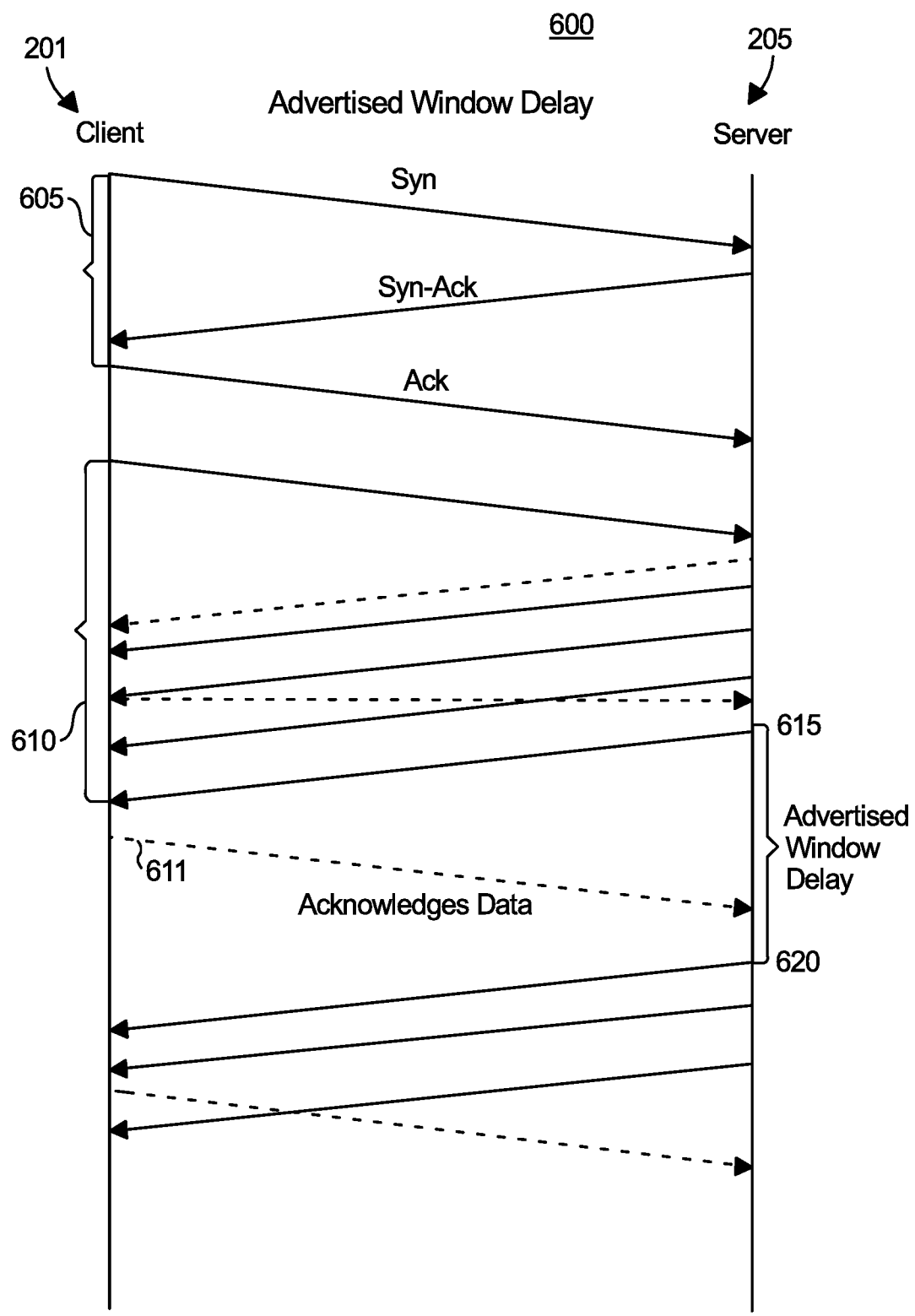
FIG. 6 is a signaling diagram, showing techniques for determining an advertised window delay.

An advertised window delay is shown in signaling diagram 600 of FIG. 6. The advertised window delay can occur at either a client 201 or server 205. Advertised Window Delay is an amount of time between a data packet and the next sent data packet during which the sender is waiting due to advertised window.

If the amount of non-acknowledged data meets or exceeds that of the last advertised window, then the sender will stop sending and wait for either the amount of outstanding data to decrease (e.g., when the receiver processes the data in its data buffers) or for the advertised window to increase. Notably, the advertised window delay can either be client-side or server-side depending on who is the sender. If the server is sending data, then the metric would be client-side advertised window delay (and vice versa). Additionally, if a zero window delay (discussed above) occurs coincident with the advertised window delay, then the zero window delay amount is subtracted from the advertised window delay to prevent aggregating delays.

During signaling 605, TCP Window sizes are exchanged during the TCP connection phase (e.g., a standard three way handshake at the start of data transmission). This TCP window represents the number of bytes a corresponding endpoint can receive before the sender stops sending data and waits for an acknowledgment (which also contains a window update). The network monitoring device 204 monitors this signal flow and maintains the TCP windows for each endpoint.

During signaling 610, data and acknowledgements flow between client 201 and server 205 and the TCP window size is updated as part of the TCP Header information passed in every TCP segment. The meaning of the window remains the same and represents the number of bytes that the each endpoint can receive. Window updates occur with every TCP segment because the TCP window is not only influenced by this flow, but all other flows between other endpoints. For example, at the same point this flow is taking place the client 201 (or server 204) might be communicating with some other endpoint and that flow impacts its window size. Also as data and acknowledgements flow between client and server a measurement device preferably maintains the number of bytes outstanding in either direction. Notably, the number of bytes outstanding has the following meaning—the number of non-acknowledged data bytes sent (e.g., yet to be acknowledged). So, for example, if the sender sends 10 data bytes and has not received an acknowledgement for any of those bytes then the outstanding data in that direction would be 10.

During acknowledges data signal 615, a sent data packet causes the number of outstanding bytes to meet or exceed the receivers advertised window marking a start of an advertised window delay.

At some point after the receiver has halted sending data due to the amount of outstanding data meeting or exceeding the outstanding data, the receiver of data will acknowledge, i.e., acknowledge data 611, some of the data it has received. If this acknowledge data 611 reduces the amount of outstanding data (i.e. it acknowledges some amount data), then the sender will be allowed to send data again.

At data signal 620, the sender resumes sending data (e.g., since there was more data to be sent). This marks an end to the advertised window delay, since the advertised window is no longer causing the sender to halt the transmission of data. Network monitoring device 204 determines the advertised window delay as a difference between the timestamp of the current packet it is now free to send less the timestamp of the packet which caused it to halt transmission.

Congestion Window Delay

Figure 7:
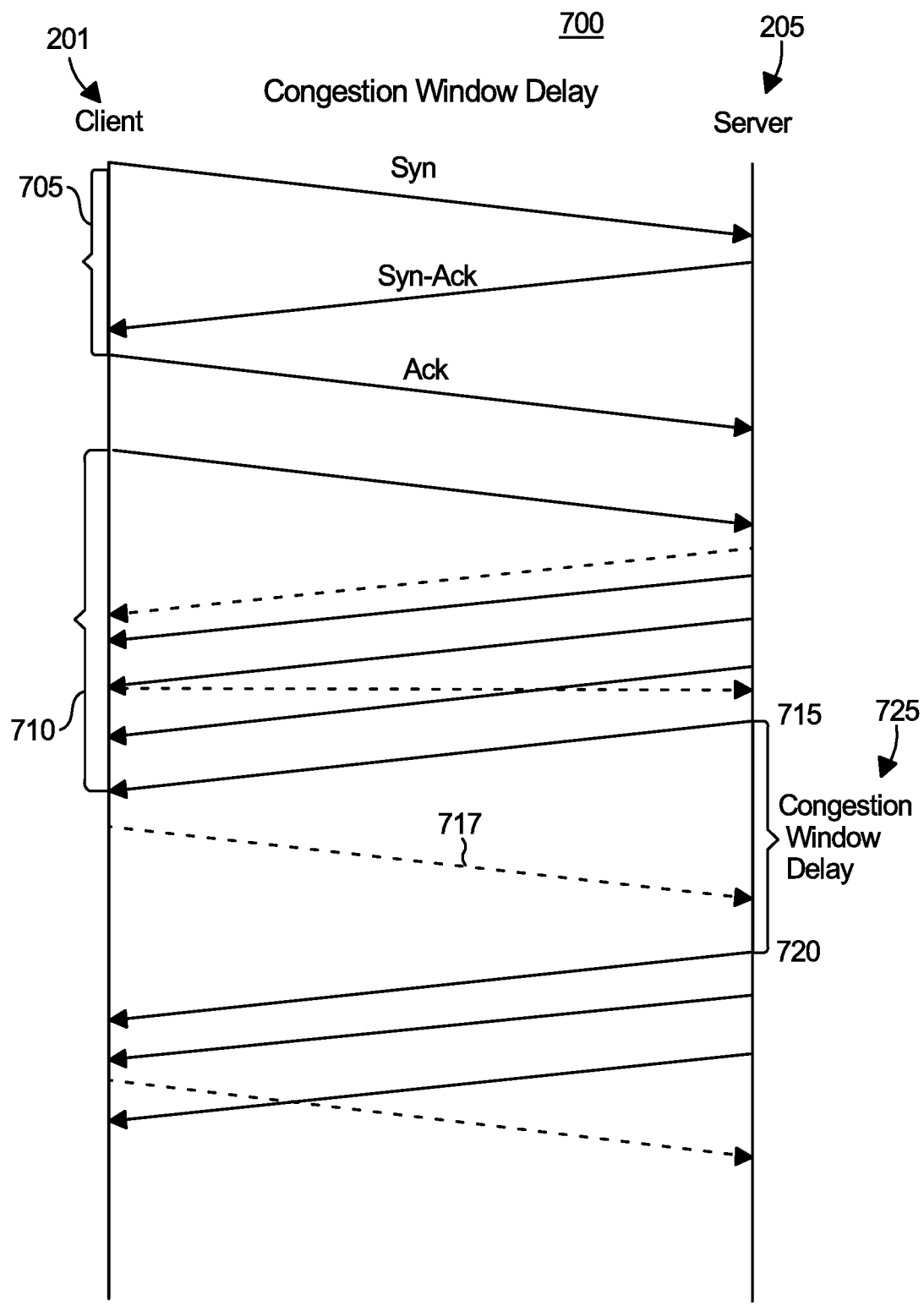
FIG. 7 is a signaling diagram, showing techniques for determining a congestion window delay.

A congestion window delay is illustrated in signaling diagram 700 of FIG. 7. Congestion window delay, similar to the above-discussed delays, can also occur on client side nodes and server side nodes. Congestion Window Delay represents an amount of time between a data packet and the next sent data packet when the sender is waiting due to the congestion window. If an amount of non-acknowledged data (e.g., data yet to be acknowledged) meets or exceeds an internal value of the congestion window of the receiving device, the sender ceases sending data and waits for either the amount of non-acknowledged data to decrease or for the congestion window of the receiver to increase.

During data signaling 705 (e.g., an initial connection phase of a TCP flow), data such as window sizes, maximum segment size, etc., is exchanged between sender device (i.e., client 201) and receiver device (i.e., server 205). In addition, during signaling 705, both the client and server initialize a congestion window. The congestion window is never exchanged, but instead, the window size is maintained internally to each device and is influenced by a number of things throughout the flow. Notably, the congestion window attempts to model network congestion (e.g., if the congestion window were to reduce to zero, this would indicate a congested network). The network monitoring device 204 uses techniques, such as those described in U.S. patent application Ser. No. 13/117,049 and published as U.S. Patent Application Publication No. 2012/0287794, the contents of which are incorporated herein by its entirety, to maintain a congestion window for each endpoint by observing the flow.

During signaling 710, data flows between the two endpoints and the respective congestion windows ebb and flows. As data is transmitted from one endpoint to the other, the congestion window represents the maximum amount of bytes that the sender can transmit before it needs to halt and wait for the congestion window to increase.

At 715, a data packet sent from client 201 causes the number of outstanding bytes to meet or exceed the congestion window of server 205 thereby causing the sender (i.e., client 201) to cease transmission of additional data. The network monitoring device marks a start of the congestion window delay once this occurs.

Subsequently, client 201 receives an acknowledgement from server 205 causing client 201 to increase its congestion window and continue sending data.

At 720, client 201 resumes sending data thereby indicating that client 201 had more data to send. At this point, since the congestion window is no longer causing the sender to halt the transmission of data, the network monitoring device 204 now determines an end to the congestion window. The total congestion window delay is determined by the networking device 204 as a difference between the start of the congestion window delay and the end of the congestion window delay.

Slow Start Delay (a Specialized Type of Congestion Window Delay)

Figure 8:
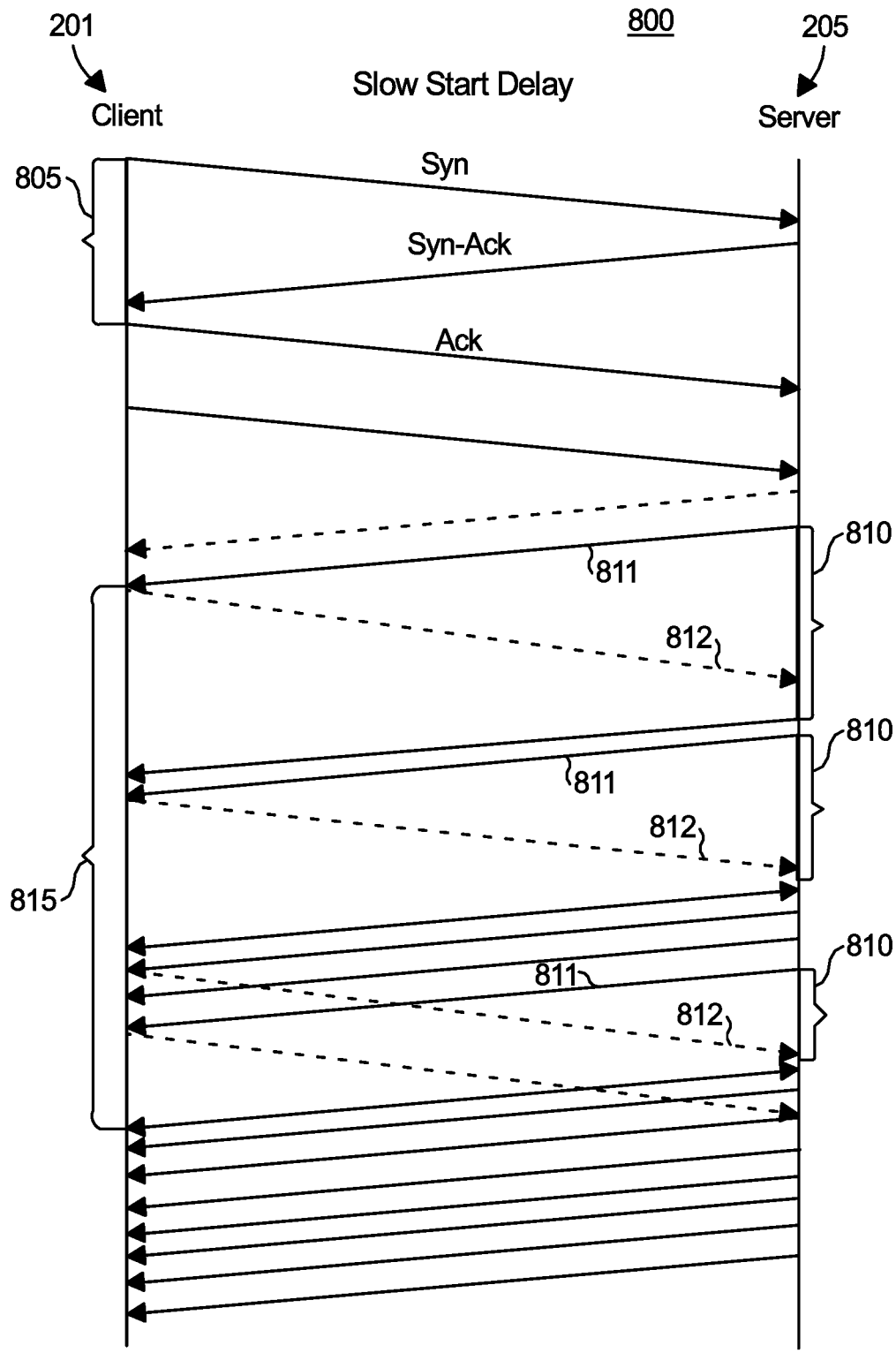
FIG. 8 is a signaling diagram, showing techniques for determining a specific type of congestion window delay—a slow start delay.

FIG. 8 provides a signaling diagram 800, showing techniques for determining a specific type of congestion window delay—a slow start delay. Similar to the congestion window delay, discussed above, a slow start delay is a type of congestion window delay where a sender increases the rate at which it sends based on the acknowledgements received. In particular, TCP Slow Start is part of TCP congestion control designed to allow the sender to limit the amount of data sent so as to not overload the network.

The network monitoring device determines an amount of time or delay waiting for acknowledgements, while limited by the Slow Start algorithm. More specifically: Slow Start Delay is the time from the last data packet sent when under a congestion limited environment to when the next data packet is sent due to an acknowledgment allowing for another data packet to be sent. Notably, a Slow Start delay can occur more than once over a transaction due to timeout or retransmission. Signaling diagram 800 highlights a Slow Start Delay from the beginning of a signal flow, but such signal flow could also demonstrate a slow start delay at a later time.

During signaling 805, initial connection data is exchanged to/from client 201 and server 205. For example this initial connection phase of a TCP flow, a number of things occur such as the exchanging window sizes, maximum segment size, etc. Also during this initial connection phase, both the client 201 and server 205 initialize a congestion window, as discussed above.

As shown in signaling 815, a "Slow Start" operation ramps (slowly) or increases transmission of data based on a number of acknowledgements received. As shown in diagram 800, the sender (i.e., server 205) can send one segment, then two, four, eight and so on. The "Slow Start" operation occurs at a start of a flow of data, but as noted above, it can also occur at a later point in time (e.g., if network congestion is detected). The slow start operation period ends when a corresponding congestion window of the sender is increased to either meet or exceed the receivers advertised window. Network monitoring device 204 monitors the data flow and determines if the sender and/or receiver are transmitting data according to a slow start operation.

A slow start delay occurs during the signaling 810 (e.g., during slow start operations) when data transmission ceases due to a congestion window of the sender being too small. Put differently, signal 811 marks a start to a slow start delay since a data packet transmitted from the sender (i.e., server 205) causes the amount of outstanding data to meet or exceed the congestion window thereby causing the sender to stop sending data.

A slow start delay ceases when an acknowledge is received (i.e., signal 812) from receiver 201. The slow start delay ceases since the congestion window increases (due to receipt of an acknowledgment), indicating that the sender can continue sending data. If the sender does send more data, it is inferred that that there was more data to send and thus, monitoring device 204 can determine a slow start delay as a timestamp of the current data segment less a timestamp of the previous data segment sent. A total Slow Start Delay includes a sum of all the slow start delays for a slow start period or the time periods indicated in signaling 810.

Figure 9A:
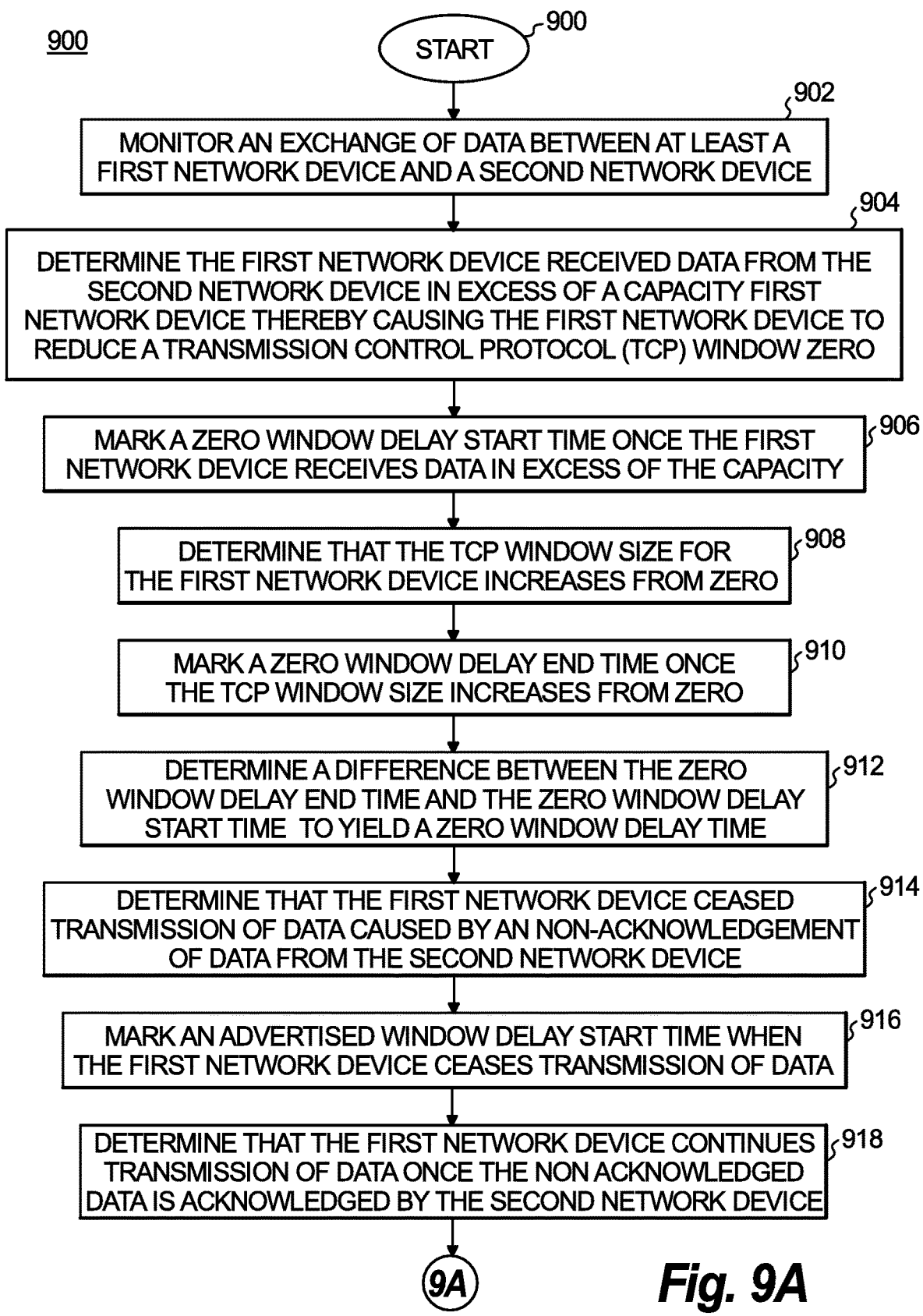

FIGS. 9A-9B illustrates an exemplary simplified procedure 900 for determining network delay, in accordance with one or more embodiments described herein. In particular, procedure 900 begins at step 901 and continues to step 902 where, as discussed above, a network monitoring device monitors an exchange of data between at least a first network device (e.g., client, server, etc.) and a second network device (e.g., client, server, etc.). Next, at step 904, the network monitoring device determines the first network device received data from the second network device in excess of a capacity first network device, thereby causing the first network device to reduce a transmission control protocol (TCP) window zero. The network device, at 906, marks a zero window delay start time once the first network device receives data in excess of the capacity. When the TCP window of the first network device increases from zero (e.g., step 908), the network monitoring device, at step 910) marks a zero window delay end time. The network monitoring device, at step 912 determines a zero window delay time as a difference between the zero window delay end time and the zero window delay start time.

In certain embodiments, as discussed above, the network monitoring device can further determine an advertised window delay shown in steps 914-922. For example, at step 914, the network monitoring device determines that the first network device ceased transmission of data caused by an non-acknowledgement of data from the second network device, and at step 916, the network monitoring device marks an advertised window delay start time when the first network device ceases transmission of data. Further, at step 918, the network monitoring device determines that the first network device continues transmission of data once the non-acknowledged data is acknowledged by the second network device, and at step 920 (continuing to FIG. 9B), marks an advertised window delay end time when the amount of unacknowledged data is acknowledged. Ultimately, the network monitoring device, at step 922, determines the advertised window delay from a difference between the advertised window delay start time and the advertised window end time.

In certain embodiments, as discussed above, the network monitoring device can further determine a congestion window delay shown in steps 924-936. In particular, at 924, the network monitoring device determines a congestion window for each of the network devices in the communication network, and at step 926, maintains a congestion window value for each of the network devices. At 928, the network monitoring device determines that the first network device ceases data transmission caused by a transmission of bytes greater than or equal to its respective congestion window value and marks (at 930) a congestion window delay start time when the first network device ceases data transmission. Once the first network device increases its congestion window (at 932), the network monitoring device, at 934, marks a congestion window delay end time when the first network device continues to transmits data. The network monitoring device, at 936, determines a difference between the congestion window delay end time and the congestion window delay start time to yield the congestion window delay.

Each of the delays determined above (e.g., advertised window delay, the zero window delay and the congestion window delay) can optionally be displayed, at 938, by a display of the network monitoring device.

Procedure 900 subsequently ends at 940, or it can optionally proceed to 902 to continue the procedure regarding a zero window delay. In certain other embodiments, procedure 900 may continue to any other of the steps above to determine any desired type of network delay. It should be noted that while certain steps within procedure 900 may be optional as described above, the steps shown in FIGS. 9A-9B are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for determining network delay with location independence. In particular, the techniques herein provide scalable solutions for future cloud or virtualized environments to measure important network metrics (e.g., delay), which assists troubleshooting and facilitates developing mitigation techniques. Moreover, based on the above-discussed network delays, measurements and delay determinations can be made on a client-side/server-side or somewhere there-between without impact to the underlying delay determinations.

While there have been shown and described illustrative embodiments that provide for location independent techniques for determining network delay, it is to be understood that various other adaptations and modifications may be made within the spirit and scope of the embodiments herein. For example, the embodiments have been shown and described herein with relation to a particular client/server; however, the embodiments in their broader sense are not as limited, and may, in fact, be used with various types of client-devices/server-devices, and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A network monitoring device performing a method for determining an advertised window delay and zero window delay in a communication network, the method comprising:
   monitoring, via a network monitoring device, an exchange of data between at least a first network device and a second network device;
   intercepting network data from the exchange of data between at least the first network device and the second network device;
   determining via analysis of the intercepted network data by the network monitoring device, that the first network device received data from the second network device in excess of a capacity of the first network device thereby causing the first network device to reduce a transmission control protocol (TCP) window to zero;
   marking a zero window delay start time once the first network device receives data in excess of the capacity;
   determining that the TCP window size for the first network device increases from zero;
   marking a zero window delay end time once the TCP window size increases from zero;
   determining, via analysis of the intercepted network data by the network monitoring device, that the first network device ceased transmission of data caused by an amount of non-acknowledged data by the second network device wherein the amount of non-acknowledged data by the second network device exceeds a previously advertised window from the first device;

marking, via the network monitoring device, an advertised window delay start time when the first network device ceases transmission of data;

determining, via the network monitoring device, that the first network device continues transmission of data once the non-acknowledged data is acknowledged by the second network device;

marking, via the network monitoring device, an advertised window delay end time when the first network device continues transmission of data;

determining a difference between the advertised window delay start time and the advertised window delay end time to yield a total advertised window delay; and wherein the network monitoring device substracts the zero window delay from the advertised window delay if the zero window delay occurs coincident with the advertised window delay wherein the zero window delay is an amount of delay time due to either the first or second network device sending a zero window and the advertised window delay is an amount of time between a data packet and a next sent data packet during which either the first or second network device is waiting due to advertised window.

2. The method of claim 1, further comprising:
displaying, via a display of the network monitoring device, the total advertised window delay and the zero window delay.

3. The method of claim 1, wherein the first network device ceases transmission of data when the amount of non-acknowledged data by the second network device exceeds a previously advertised window of the first network device.

4. The method of claim 1, wherein the first network device and the second network device include at least one of a client and a server.

5. A network monitoring device for determining an advertised window delay and zero window delay in a communication network, comprising:
one or more network interfaces adapted to communicate in a communication network and intercept network data exchanged between at least the first network device and the second network device;
a processor adapted to execute one or more processes; and
a memory configured to store a process executable by the processor, the process when executed operable to:
monitor the intercepted exchange of data between at least a first network device and a second network device;
determine, via analysis of the intercepted network data by the network monitoring device, that the first network device received data from the second network device in excess of a capacity of the first network device thereby causing the first network device to reduce a transmission control protocol (TCP) window to zero;
mark a zero window delay start time once the first network device receives data in excess of the capacity;
determine that the TCP window size for the first network device increases from zero;
mark a zero window delay end time once the TCP window size increases from zero;
determine, via analysis of the intercepted network data by the network monitoring device, that the first network device ceased transmission of data caused by an amount of non-acknowledged data by the second network device wherein the amount of non-acknowledged data by the second network device exceeds a previously advertised window from the first device;
mark an advertised window delay start time when the first network device ceases transmission of data;
determine that the first network device continues transmission of data once the non-acknowledged data is acknowledged by the second network device;
mark an advertised window delay end time when the first network device continues transmission of data;
determine a difference between the advertised window delay start time and the advertised window delay end time to yield a total advertised window delay; and
wherein the network monitoring device subtracts the zero window delay from the advertised window delay if the zero window delay occurs coincident with the advertised window delay wherein the zero window delay is an amount of delay time due to either the first or second network device sending a zero window and the advertised window delay is an amount of time between a data packet and a next sent data packet during which either the first or second network device is waiting due to advertised window.

6. The network monitoring device of claim 5, further comprising:
a display that displays the total advertised window delay and the zero window delay.

7. The network monitoring device of claim 5, wherein the first network device and the second network device include at least one of a client and a server.

* * * * *